United States Patent [19]

Singhal

[11] Patent Number: 5,172,042

[45] Date of Patent: Dec. 15, 1992

[54] BATTERY SIZE CHANGER AID

[76] Inventor: Tara C. Singhal, P.O. Box 5075, Torrance, Calif. 90510

[21] Appl. No.: 746,759

[22] Filed: Aug. 19, 1991

[51] Int. Cl.⁵ .......................................... H01M 10/44
[52] U.S. Cl. ........................................ 320/2; 320/15; 429/96; 429/100
[58] Field of Search ............... 320/2, 15; 429/96, 100, 429/121, 98; 439/500

[56] References Cited

U.S. PATENT DOCUMENTS 4,397,920  8/1983  Trattner .............................. 429/100
4,767,358  8/1988  Nullmeyer ........................... 429/100

Primary Examiner—Steven L. Stephan
Assistant Examiner—Adolf Berhane

[57] ABSTRACT

This invention would temporarily alter the size of a smaller size cell into a next larger size cell, so that smaller cell can be interchangeably used in devices designed for next larger size cell. For example it would allow a size AAA cell to be charged in the same charger that charges AA cells without the added expense of buying a AAA size charger. The size changer aid consists of two hollow tubes. One of the hollow tube is inserted on to the top end of a smaller size cell until all the way such that the positive terminal of the cell is accessible from the end of the tube. The other hollow tube with a conducting button is inserted on the bottom end of the cell. A smaller size cell adorned with these two hollow tube, one at the top end and the other at the bottom end, with the cells positive terminal accessible from the top, and the cell's negative terminal accessible through the bottom via the button, can be inserted inside a commercially available charger's charging space for next larger size battery cell, thereby enabling a size AAA nickel cadmium battery cell to be charged form a charger designed for size AA cells.

1 Claim, 1 Drawing Sheet

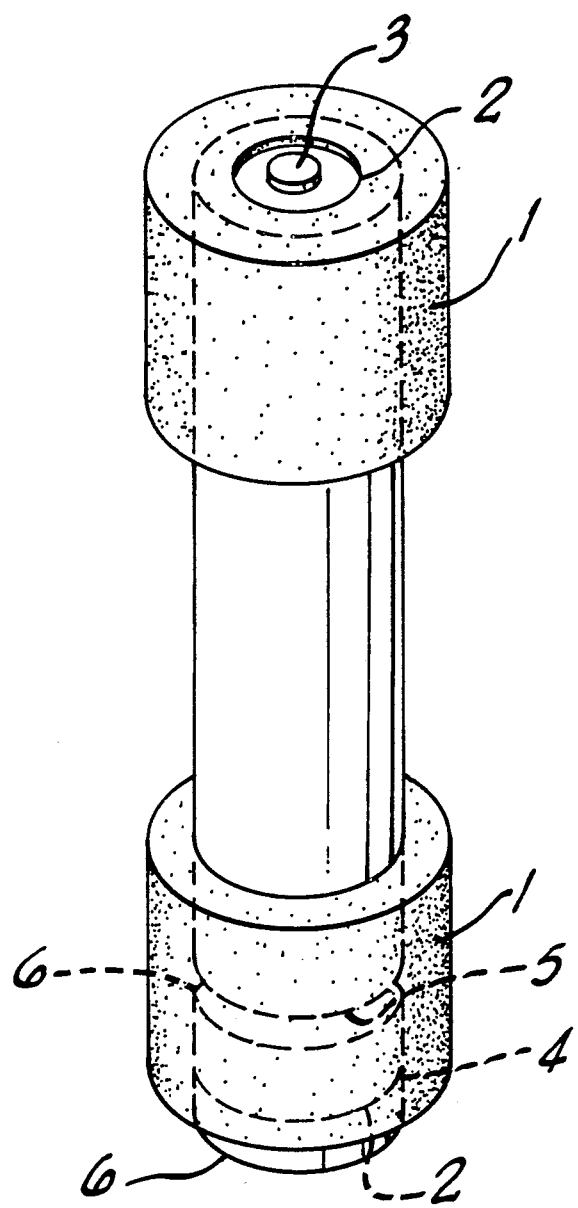

BATTERY SIZE CHANGER AID

CROSS REFERENCE

Application of Tara Chand Singhal filed Aug. 10, 1991; titled Rechargeable Battery Pack Device, U.S. Ser. No. 07/743,171.

BACKGROUND OF THE INVENTION

The 1.5 volt, or 1.2 volt for nickel cadmium rechargeable battery cells, come in four different common sizes identified as AAA, AA, C and D. Electronic devices are designed to use one of these specific sizes. The nickel cadmium battery chargers are also designed to charge one of these sizes or sometimes a combination of these sizes.

This invention would temporarily alter the size of a smaller size cell into a next larger size cell, so that smaller cell can be interchangeably used in devices designed for next larger size cell. For example it would allow a size AAA cell to be charged in the same charger that charges AA cells without the added expense of buying a AAA size charger.

Although the invention was conceived for using AAA size cell in AA size location as explained below, it could be used for changing an AA size cell into size C cell and so on.

The size AA battery cells are much widely used than are size AAA cells since more portable electronic devices are designed to use size AA cells. Therefore the size AA battery chargers are also commonly available and almost all households have them. However size AAA cells are less common in use and therefore their chargers are less commonly available and very few households would have size AAA chargers. The invention described in the Cross reference would make use of size AAA cells much more common.

Few size AAA chargers that some household might have, allow only two or four size AAA cells to be charged at one time. This invention would allow more AAA size cells to be charged at the same time without the expense of buying additional AAA size charger.

SUMMARY OF THE INVENTION

This invention would temporarily alter the size of a smaller size cell into a next larger size cell, so that smaller cell can be interchangeably used in devices designed for next larger size cell. For example it would allow a size AAA cell to be charged in the same charger that charges AA cells without the added expense of buying a AAA size charger.

BRIEF DESCRIPTION OF THE DRAWING

FIG. 1. Device to enable a smaller size battery cell to fit in the space of the next larger size battery cell.

PREFERRED EMBODIMENT

Refer to FIG. 1. Any suitable housing to accommodate a smaller size cell and dimensionally and electrically change it into a next larger size cell (1). The housing has means to extend the electrical terminal by means of a conducting material to the spatial location of the terminal of the next larger size cell (4).

The design and material of the housing is such:
that it would not interfere with the operation of the cell in a device designed to accommodate a next larger size cell,
that it would not interfere with the end terminal of the cell for purpose of making electrical contact with the device in which it will be used,
that it would not interfere with the dissipation of heat generated by the cell,
that it would snugly fit onto the battery cell and can be easily removed or put on with the use of bare hands and
that the positive and negative terminals of the smaller size cell enclosed in the housing are in same spatial relationship as would the terminal of the next larger size cell.

One embodiment is to enable size AAA cell to be charged in the same charger that charges AA cells without the added expense of buying a AAA size charger. This battery size changer aid consists of two hollow tubes of suitable material (1). Both hollow tubes have an internal diameter of nearly 13/32 inches and external diameter of nearly 9/16 inches and nearly half inch in length. Both hollow tube are open at one end and closed at the other end but with a hole nearly ¼ inches in diameter at that end (2). One of the hollow tube is inserted on to the top end of a size AAA cell until all the way such that the positive terminal of the cell is accessible from the closed end of the top of the tube (3).

To provide electrical contact, a conducting material cylindrical button of nearly 13/32 inches diameter and thickness of nearly 3/16 inches inserted in side the other hollow tube such that the said cylindrical button is inserted in the hollow tube all the way until it is flush with the end that is closed (4). This hollow tube with the conducting button inside, is inserted on the bottom end of a size AA cell until the cell is touching the button to provide an electrical contact (5). The cylindrical button has sharpened or tapered ends to facilitate making of electrical contacts (6).

A size AAA cell adorned with these two hollow tube, one at the top end and the other at the bottom end, with the cells positive terminal accessible from the top (3), and the cells's negative terminal accessible through the bottom via the button (5), can be inserted inside a commercially available charger's charging space for one AA size battery cell, thereby enabling a size AAA nickel cadmium battery cell to be charged form a charger designed for size AA cells.

Therefore I claim:

1. A battery size changer aid, specifically used for charging smaller size batteries in next larger size accommodating charging devices, comprising of:
    a. a rechargeable battery cell;
    b. two hollow tubes of a suitable material;
    c. the said suitable material is such rubber like that it would snugly fit onto the said cell and can be easily removed or put on with the use of the bare hands;
    d. said hollow tubes have an internal diameter of nearly 13/32 inch and an external diameter of nearly 9/16 inch and nearly half inch in length;
    e. the said hollow tubes are open at one end and closed at the other end but with a hole nearly ¼ inch in diameter at that end;
    f. a conducting material cylindrical button of nearly 13/32 inch diameter and thickness of nearly 3/16 inch;
    g. the two ends of the said button are sharpened or tapered to facilitate making of electrical contacts;
    h. the said cylindrical button is positioned in the one hollow tube all the way until it is flush with the end that is closed and has said nearly ¼ inch hole;
    i. the negative terminal end of the said cell fitted on with the said hollow tube with the said button;
    j. the positive terminal end of the said cell fitted with the said hollow tube with out the said button.

* * * * *